Figures 1, 2:
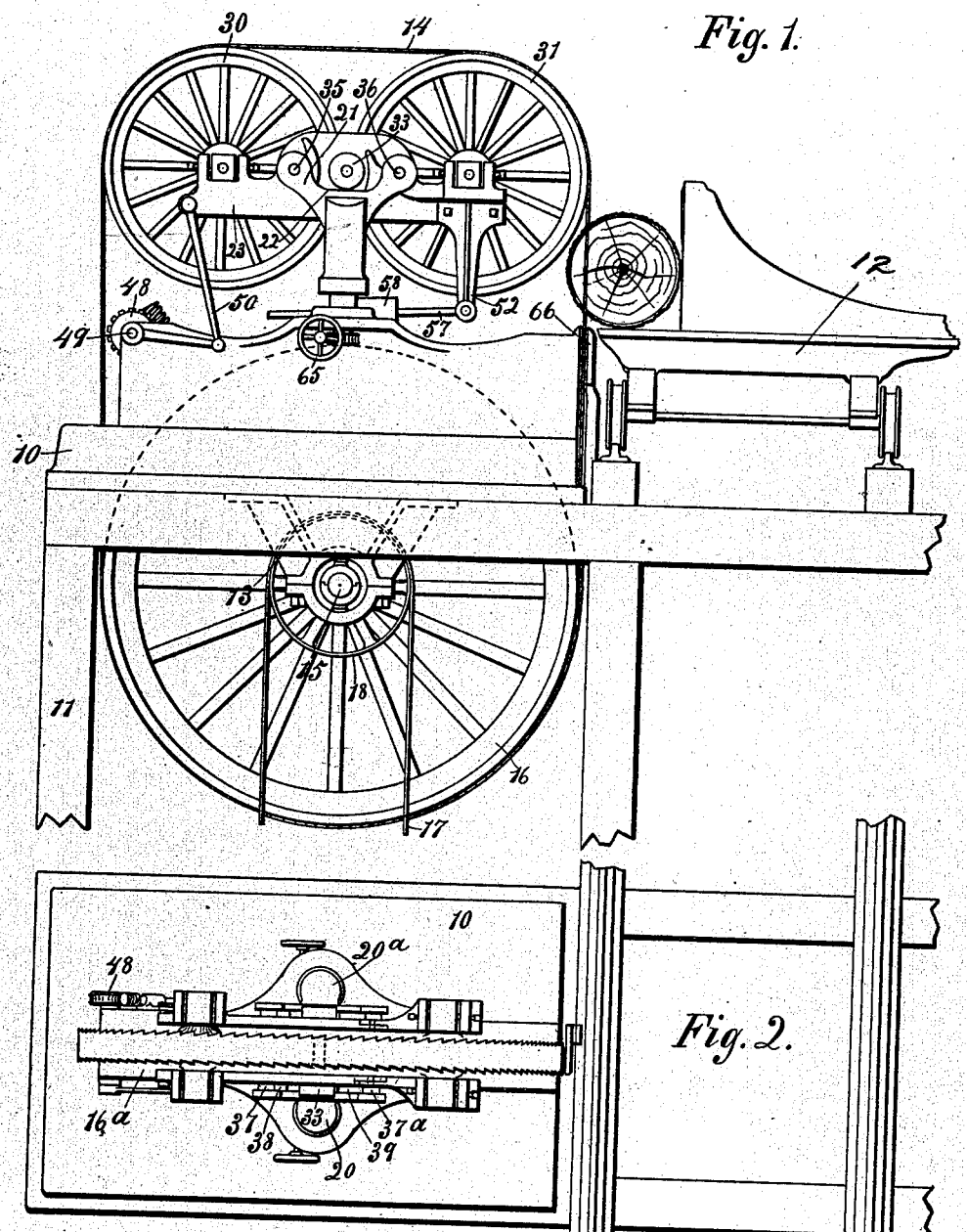

No. 716,169. Patented Dec. 16, 1902.
R. F. BARKER.
BAND SAW MILL.
(Application filed Jan. 23, 1901.)
(No Model.)
3 Sheets—Sheet 1.

WITNESSES:

INVENTOR.
Ruben F. Barker
BY
ATTORNEY.

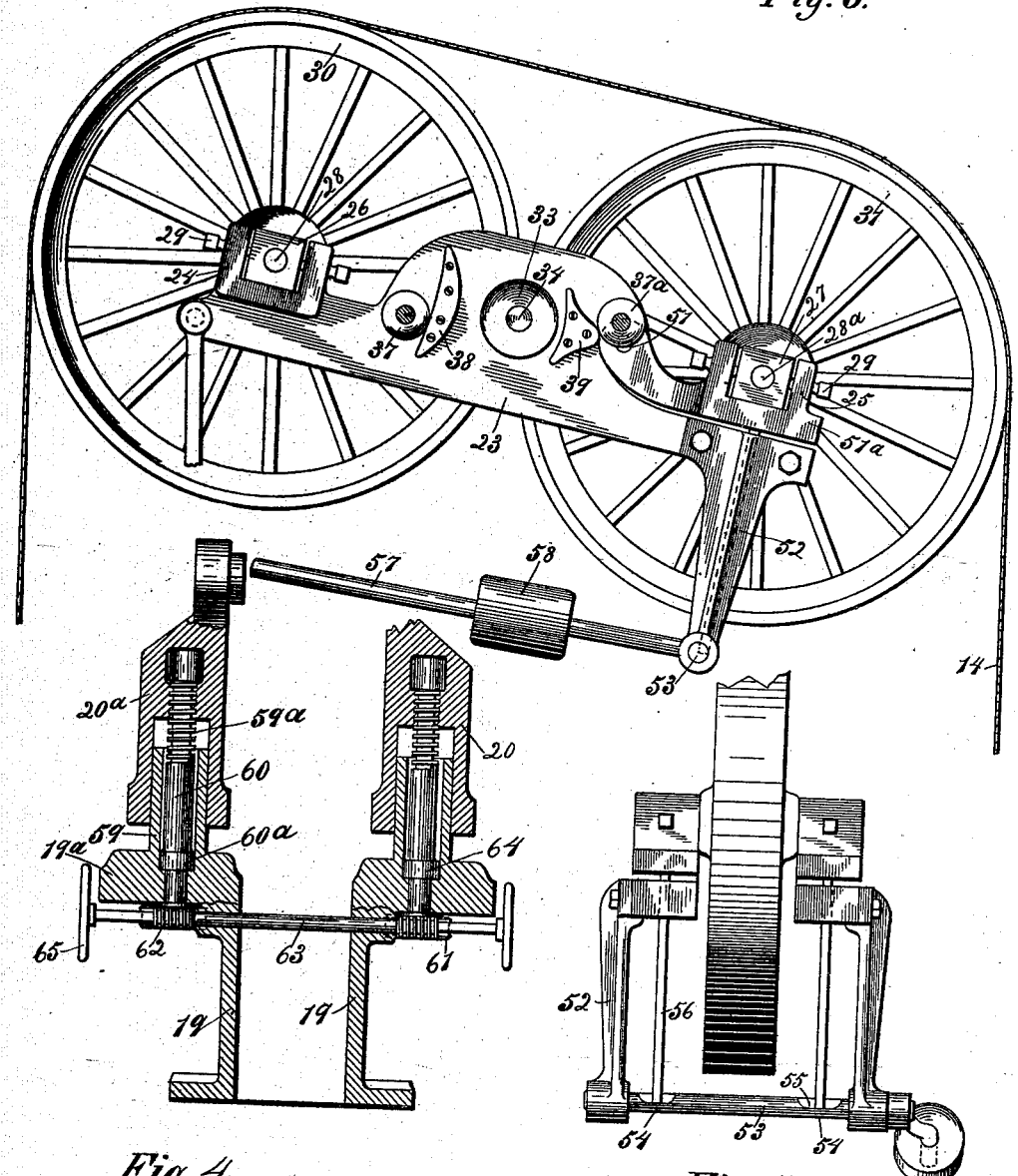

No. 716,169. Patented Dec. 16, 1902.
R. F. BARKER.
BAND SAW MILL.
(Application filed Jan. 23, 1901.)
(No Model.) 3 Sheets—Sheet 3.
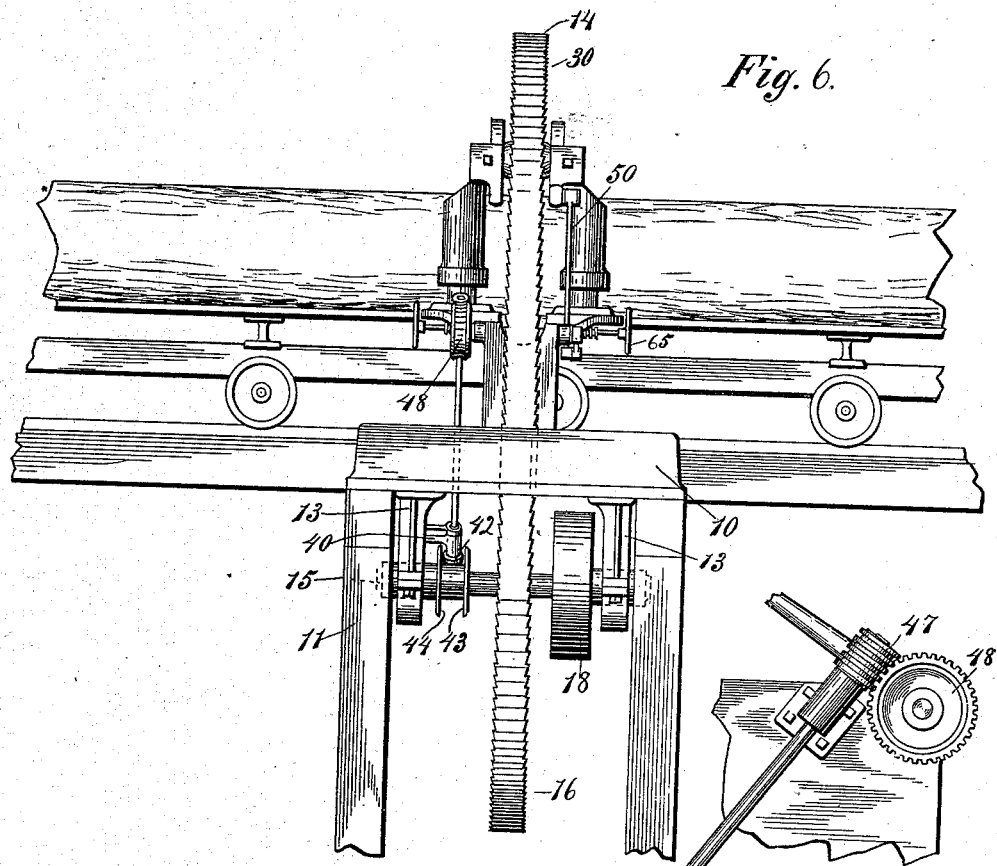
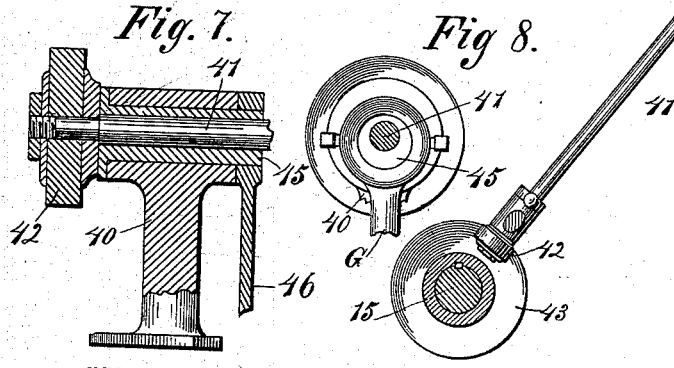

UNITED STATES PATENT OFFICE.

RUBEN F. BARKER, OF MARINETTE, WISCONSIN, ASSIGNOR OF ONE-HALF TO MICHAEL CORRY, OF MARINETTE, WISCONSIN.

BAND-SAW MILL.

SPECIFICATION forming part of Letters Patent No. 716,169, dated December 16, 1902.

Application filed January 23, 1901. Serial No. 44,457. (No model.)

*To all whom it may concern:*

Be it known that I, RUBEN F. BARKER, a citizen of the United States, and a resident of Marinette, county of Marinette, and State of Wisconsin, have invented certain new and useful Improvements in Band-Saw Mills, of which the following is a specification, and which are illustrated in the accompanying drawings, forming a part thereof.

My invention relates to improvements in sawmills, and particularly to that class in which a double-edged band-saw is employed, and to means for accomplishing certain results in the simplest and most efficient manner.

One of the objects sought in a device of the character to which my invention appertains is to eliminate to as great an extent as possible the vibratory movement of the saw in cutting through timber, the vibration referred to resulting in the loss of material, owing to the width of the cut incident thereto. In sawmills employing a single-edge saw the desired result has been sought to be attained by providing guides adapted to confine and steady that part of the saw between them and in the act of cutting; but such guides cannot be satisfactorily used when a double-edge saw is employed, and it is one of the objects of my invention to dispense with such means and to accomplish the desired result in a more satisfactory and efficient manner.

Another object of the invention is to provide improved means for automatically straining or maintaining the desirable tautness of the saw at all times and to overcome the tendency of the saw to slack or buckle when it begins to cut suddenly after running free.

A further object is to provide means for adjusting the band-saw and for rendering the same easily removable from its carrying-pulleys when it is desired to sharpen it and for other purposes.

In carrying out my invention it is to be observed that the construction may be greatly varied, and it is not my intention to limit myself to mechanical details, provided such means are employed as will enable the objects of my invention to be carried out, and while the invention is described in connection with a double-edge band-saw it is obvious that it is equally applicable to band-saws of all descriptions.

The invention consists in the structure hereinafter described and which is illustrated in the accompanying drawings, in which—

Figure 1 is a side elevation of the machine, some of the parts being in section. Fig. 2 is a plan view. Fig. 3 is a detail side view, partly in section, of the upper works of the machine. Fig. 4 is a cross-section of the frame and supports for the rocking or walking beams. Fig. 5 is a detail front view with the saw removed. Fig. 6 is a rear view. Figs. 7, 8, and 9 are details of the mechanism for operating the shifting lever.

Referring to the drawings, 10 designates the sawmill-platform, 11 the frame for supporting the platform and the sawmill mounted thereon, and 12 the sawmill-carriage, adapted to carry a log longitudinally across the edge of the saw 14, said parts being of the usual and ordinary construction appertaining to band-saw mills. Depending from the under side and located near each edge of the table 10 is a shaft-hanger 13, and journaled therein is a driving-shaft 15. Power is supplied to the machine through the medium of a belt 17 and pulley 18, keyed to the shaft 15 in the usual manner. The main saw-wheel 16 is also keyed to the shaft 15 and extends up through an opening $16^a$, formed in the platform 10.

Carried by the platform 10, one at each side thereof, are a pair of vertical standards 19, each having a shelf or bracket $19^a$ at the upper end thereof, in which is journaled the lower end of a vertical shaft 60, the said shaft having a collar or annular flange 64, adapted to rest in a pocket $60^a$ of the shelf $19^a$. A column 59 is fixed to the upper side of the shelf $19^a$ and is adapted to guide a support $20^a$, telescopically engaging the said column. The supports $20^a$, each having a bifurcated or yoke-shaped upper end 21, forming a flat or track portion 22, are interiorly screw-threaded and are raised or lowered by the shafts 60, the ends of which are threaded and engage the threads of the supports $20^a$. A shaft 63, having a worm 62, meshing with a worm-gear 61 on the lower end of each of the shafts 60, is journaled in the standards 19, and hand-wheels 65 provide means whereby the mechanism may be set in motion to raise or lower the supports 20 and 20$^a$, and thereby the band-saw pulleys 30 and 31, when it is desired to remove the saw from the pulleys or for other purposes.

23 designates two rocking or tilting beams, each of which has near each end thereof pairs of upstanding lugs 24 and 25, adapted to seat the bearing-boxes 26 and 27, and the said boxes are adjustably held in their seats by retaining bolts or screws 29, the distance between each pair of lugs being greater than the width of the bearing-box located therein.

Shafts 28 28$^a$ are journaled in the boxes 26 27 and carry, respectively, the saw-pulleys 30 and 31, over which the saw 14 travels. Each of the beams 23, supporting the saw-pulleys, has intermediate of its ends a roller 33, carried by a trunnion 34, and these rollers, which are intended to travel over the track 22, formed at the upper end of the supports 20 and 20$^a$, permit of a longitudinal as well as a rocking or tilting movement of the said beams. This longitudinal movement is necessary in order that when the beams carrying the pulleys 31 and 32 are tilted the section of the saw at work may be maintained always at the same angle with relation to the frame of the machine. For example, referring to Fig. 1 of the drawings, if no means were provided for shifting or moving longitudinally the beams 23, the plane of the traveling saw toward the load would vary as the angle of the beams changed, and it would be impossible to make a true cut.

The longitudinal and rocking movement of the beams 23 is accomplished by the following-described mechanism: Arms 35 and 36, forming the saddle 21 of the supports 20 and 20$^a$, carry the rollers 37 37$^a$, said rollers acting against peculiarly-shaped shifting-cams 38 and 39, fixed to the beams, respectively, the former being substantially crescent-shaped and the latter triangular, the sides of the same being slightly concave and the angle toward the roller 37$^a$ rounded. A bracket 40 is secured to one of the shaft-hangers 15 and carries a shaft 41, at the lower end of which there is mounted a friction-wheel 42, capable of being thrown into engagement with either of the disks 43 and 44, fixed to the shaft 41. The shaft 41 is journaled within an eccentric sleeve 45, which in turn is journaled in the bracket 40, the said sleeve being controlled by a hand-lever 46, which may project (not shown) up through the floor of the mill and be so located as to be within easy reach of the operator. By turning the eccentric sleeve the friction-wheel 42 is thrown into contact with one or the other of the disks 43 and 44, and thereby driven in either direction at will. The upper end of the shaft 41 is provided with a worm 47, which meshes with a worm-gear 48. A shaft 49, journaled in the frame of the mill, moves a toggle-joint 50, pivotally connected to one end of the frame 23.

Pivotally connected at 51 to each of the beams 23, toward the front of the machine, is an arm 51$^a$, which arm is formed with the flanges 25, forming a seat for the bearing-box 27, wherein is journaled the shaft 28$^a$ of the pulley 31, as heretofore described. Depending from the beams 23, immediately under the shaft 28$^a$, are arms 52, the lower end of said arms providing a bearing for a shaft 53, having recessed or cam sections 54, each of which receives the lower end of a rod 56, which passes up through the end of the beam 23 and bears against the lower face of the pivoted arms 51.

A weight-lever 57, extending backwardly from the shaft 53, has thereon an adjustable weight 58, which may be so adjusted that any tendency to slack in the saw will be neutralized, the lever under the influence of the weight and through the medium of the eccentric action of the rings 54 forcing the rods 56 against the pivoted arms 51, and thereby straining the saw and maintaining the desirable tautness.

The operation of the tilting mechanism will be readily understood. Assuming that the beams are in their normal position, as illustrated in Fig. 1, and that the log to be operated on is of small diameter, the lever 46 is moved in the proper direction to throw the rear ends of the tilting beams 23 upwardly. As soon as this rising movement begins the rollers 37 are engaged by the crescent-shaped cams 38, and the distance from the axis of the trunnions 34 to the extremities of the cams being greater than from the same point to the center of the face thereof the result is to push the cams forwardly, and thereby the beams 23, the upper concaved sides of the triangular cams 39 pressing against the rollers 37$^a$ and the rollers 33 traveling over the track 22. This movement will throw the band-saw pulley 31 toward the log about to be cut, and the said pulley may be adjusted as close thereto as is desired, the shifting mechanism causing the side of the saw at work to always move in a vertical plane. The saw when it leaves the flat periphery of the pulley 31 is free from vibration, and as this pulley is brought in close proximity to the load, it being adjusted in accordance with the size thereof, and a guide 66 secured to the frame of the machine in the path of the saw and immediately below the log, assisting in confining and steadying the saw after it has performed its cutting operation, it will be seen that no vibration can occur in that portion of the saw actually cutting.

To raise the forward end of the beams 23, the movement of the lever 46 is reversed, and the rounded angle of the triangular cam 39, acting against the pulley 37, forces the beams rearwardly, the rollers 33 rolling back over the track 22.

My invention contemplates in sawmills any mechanism employing a pulley carried by a fixed support and having an adjustable guide pulley or pulleys and provided with means for maintaining at all times a uniform straining of the saw without regard to the relative movement of the pulleys. Further, I do not wish to confine myself to the precise shape and arrangement of the cams shown for shifting the rocking beams carrying the saw-pulleys, but claim, broadly, any mechanism that will accomplish the same result.

I claim as my invention—

1. In a band-saw mill, in combination, a saw, pulleys for carrying the saw, means for varying the cutting stretch of the saw, and means acting in unison with such adjusting means for maintaining the strain upon the saw.

2. In a band-saw mill, in combination, a saw-driving wheel, a saw-guiding wheel movable to and from the drive-wheel without changing the cutting plane and through a range corresponding with the variations in size of the material for which the mill is adapted, and means for maintaining a constant strain upon the saw.

3. In a band-saw mill, in combination, pulleys for carrying the saw, means for relatively adjusting the pulleys to vary the cutting stretch of the saw, and means acting in unison with such adjusting means for maintaining the strain upon the saw.

4. In a band-saw mill, in combination, a saw, a pulley over which the saw travels, means for adjusting the pulleys to vary the length of the cutting stretch of the saw, means governing the movement of the pulley for maintaining the saw always in the same cutting plane, and means acting in unison with the adjusting means for maintaining the strain upon the saw.

5. In a band-saw mill, in combination, a saw, means for driving the saw, supports mounted on the frame of the mill, beams carried by the supports, a pulley journaled on the beams, and means for tilting the beams to vary the length of the cutting stretch of the saw according to the size of the material without changing the cutting plane or altering the strain of the saw.

6. In a band-saw mill, in combination, a saw, means for driving the saw, a support, a rocking beam carried by the support, a saw-pulley journaled on the beam, means for rocking the beam, means for maintaining the saw always in the same cutting plane, and means for maintaining the strain of the saw in compensation for the disturbance of strain due to the rocking of the beam.

7. In a band-saw mill, in combination, a saw, a driving-pulley, a rocking beam fulcrumed between its ends, a pulley mounted at each end of the beam for carrying the saw, means for rocking the beam on its fulcrum, and means for moving the beam longitudinally as it rocks.

8. In a band-saw mill, in combination, a frame, a driving-wheel journaled in fixed hangers, supports each of which is provided with a track at its upper end and mounted on the frame, beams supported on the tracks and carrying pulleys, a saw traveling over said pulleys, and means for tilting the beams and means for moving them in a longitudinal direction.

9. In a band-saw mill, in combination, a frame, a driving-wheel journaled in fixed hangers, adjustable supports mounted on the frame, beams carried by the supports, pulleys journaled on the beams, a saw traveling over said pulleys, and means for tilting the beams and also for moving them in a longitudinal direction.

10. In a band-saw mill, in combination, a driving-wheel journaled in fixed hangers, a saw, pulleys, one of which guides the saw to its work, beams carrying the pulleys, supports for the beams, means for tilting the beams, and means for adjusting the supports vertically.

11. In a band-saw mill, in combination, a driving-wheel journaled in fixed hangers, a saw, pulleys, one of which guides the saw to its work, beams on which the pulleys are journaled, the said beams being capable of a tilting and a longitudinal movement, supports for the beams, and means for vertically adjusting the supports.

12. In a band-saw mill, in combination, a driving-wheel journaled in fixed hangers, a saw, vertically-adjustable supports, beams carried by said supports, pulleys carried by said beams, one of said pulleys guiding the saw to its work, means for tilting the beams, means for moving the beams longitudinally, and means for raising and lowering the supports.

13. In a band-saw mill, in combination, a frame, a saw-driving wheel journaled in fixed hangers, a saw, pulleys, over which the saw travels, carried by movable beams, one of the pulleys being journaled in arms pivoted to the beams, and means for swinging the arms on their pivots for the purpose of tensioning the saw.

14. In a band-saw mill, in combination, a saw, means for driving the saw, a support mounted on the machine, a rocking beam fulcrumed between its ends on the support, a saw-pulley journaled at each end of the beam, means for rocking the beam on the support, and means for automatically moving the beam longitudinally with reference to the frame of the machine for maintaining the saw always in the same cutting plane.

15. In a band-saw mill, in combination, a saw, means for driving the saw, a support carried by the frame of the machine, a beam resting between its ends on the support, a saw-pulley journaled at each end of the beam, and means for tilting the beam and means for moving the beam longitudinally with reference to the frame of the machine for maintaining the saw at work always in the same cutting plane.

16. In a band-saw mill, in combination, a saw, pulleys for carrying the saw, means for varying the cutting stretch of the saw, means acting in unison with such adjusting means for maintaining the strain upon the saw, and means for taking up the slack of the saw.

17. In a band-saw mill, in combination, a driving-wheel, a saw, pulleys, one of which guides the saw to its work, rocking beams on which the pulleys are journaled and which are fulcrumed between their ends on the supports, means for rocking the beams, cams carried by the beams, and means carried by the supports coöperating with the cams for moving the beams longitudinally.

18. In a band-saw mill, in combination, a saw, means for driving the saw, supports, a frame fulcrumed between its ends and adapted to rock and to roll on the supports, pulleys, one of which guides the saw to its work, journaled on the frame, means for rocking the frame, cams carried by the frame, and rollers journaled on the supports adapted to coöperate with the cams for moving the frame longitudinally.

19. In a band-saw mill, in combination, a saw, a driving-wheel for the saw, pulleys, one of which guides the saw to its work, and means for moving the pulleys simultaneously in opposite directions for varying the cutting stretch of the saw without changing the cutting plane of the saw.

20. In a band-saw mill, in combination, a saw, a driving-wheel for the saw, pulleys, one of which guides the saw to its work, and means for moving the pulleys simultaneously in opposite directions for varying the cutting stretch of the saw without changing the plane or disturbing the strain of the saw.

21. In a band-saw mill, in combination, a saw, means for driving the saw, rocking beams, arms pivoted to the beams, a saw-pulley journaled on the arms, means for moving the arms on their pivots, means for rocking the beams, and means for maintaining the saw always in the same cutting plane.

22. In a band-saw mill, in combination, a saw, means for driving the saw, rocking beams, arms pivoted to the beams, saw-pulleys carried by the beams and one of which is journaled on the arms, a cam-shaft, a rod actuated by the cam-shaft for swinging the arms on their pivots, means for imparting motion to the shaft, means for rocking the beams, and means for maintaining the saw always in the same cutting plane.

23. In a band-saw mill, the combination of a main driving-wheel carried in normally fixed bearings, an upper carrying-wheel vertically adjustable through a range sufficient to enable it to be brought close to the smallest log or cant or to be carried above the largest log or cant for which the mill is designed; and a third wheel movable in a direction to take up the slack occasioned by the lowering of the upper wheel and adapted to maintain approximately uniform tension upon the saw-blade or band.

24. In a band-saw mill, in combination, a saw-driving wheel, a saw-guiding wheel movable parallel with the sawing plane and through a range corresponding with the variations in size of the material operated on, and a saw-straining wheel movable through a corresponding range for the purpose specified.

25. In a band-saw mill, in combination, a saw-driving wheel mounted in stationary bearings, a saw-guiding wheel mounted in bearings movable parallel with the cutting plane of the saw and through a range corresponding with the variations in size of the material operated on, a saw-straining wheel mounted in bearings movable through a corresponding range, and operative connection between the bearings of the guiding and the straining wheels.

RUBEN F. BARKER.

Witnesses:
W. W. SKINNER,
JOE M. DALTON.